United States Patent [19]

Pelte et al.

[11] 3,801,194

[45] Apr. 2, 1974

[54] FADE-IN AND FADE-OUT ARRANGEMENT FOR MOVIE CAMERAS

[75] Inventors: Richard Pelte; Theo Huber, both of Munich; Helmut Mayr, Taufkirchen, all of Germany

[73] Assignee: AGFA-Gevaert Aktiengesellschaft, Leverkusen, Germany

[22] Filed: Feb. 27, 1973

[21] Appl. No.: 336,363

[30] Foreign Application Priority Data

Feb. 28, 1972 Germany............................ 2209399

[52] U.S. Cl. .................................... 352/91, 352/141

[51] Int. Cl. ............................................ G03b 21/36

[58] Field of Search ............................... 352/91, 141

[56] References Cited

UNITED STATES PATENTS

| | | | |
|---|---|---|---|
| 3,517,990 | 6/1970 | McGillion et al. | 352/91 |
| 3,623,989 | 11/1971 | Mayr et al. | 352/91 |
| 3,419,325 | 12/1968 | Mayr et al. | 352/91 |
| 3,649,109 | 3/1972 | Isono et al. | 352/141 |

*Primary Examiner*—Fred L. Braun
*Assistant Examiner*—Russell E. Adams, Jr.
*Attorney, Agent, or Firm*—Michael S. Striker

[57] ABSTRACT

The exposure control circuit of the camera has a photosensitive element connected in series with a moving coil instrument controlling the aperture. A normally blocked transistor has an emitter-collector circuit connected in parallel with the photosensitive element. A timing capacitor is connected from the collector to the base of the transistor. A switch is provided which, when closed, connects an additional resistor in parallel with a portion of the voltage divider controlling the base of the transistor so that the transistor becomes conductive allowing the capacitor to discharge. A second transistor has an emitter-collector circuit connected in parallel with the additional resistor. The base of the second transistor is connected to the driving motor in such a way that the second transistor is fully conductive when the motor is deenergized, thereby allowing a rapid fade-out and is blocked when the motor is energized, causing a slow fade-out.

8 Claims, 1 Drawing Figure

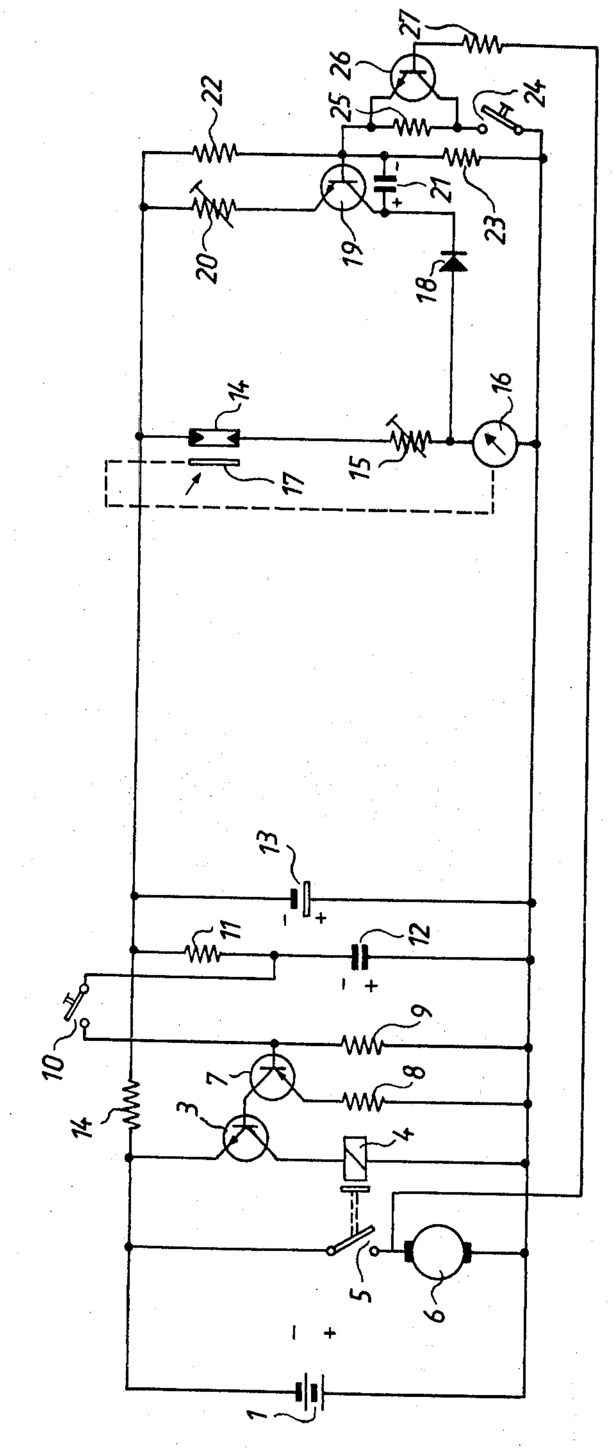

FADE-IN AND FADE-OUT ARRANGEMENT FOR MOVIE CAMERAS

BACKGROUND OF THE INVENTION

The present invention relates to fade-in and fade-out arrangements for movie cameras having a photosensitive element such as a photoresistor for controlling the current through a diaphragm control means. Further, arrangements are known wherein a transistor has an emitter-collector circuit connected in parallel with the photosensitive element and a base to which is connected an RC timing circuit.

The present invention comprises an improvement of the above-described circuitry. In particular, it is very difficult for a photographer using a motion picture camera which has no aperture indicator, to determine at which point the aperture is fully closed at the beginning of a fade-in. Thus it is desirable that an aperture closing immediately preceeding a fade-in take place as rapidly as possible so that the camera is always ready for the subsequent fade-in.

SUMMARY OF THE INVENTION

The present invention thus resides in a motion picture camera having photosensitive means, diaphragm control means connected to said photosensitive means for controlling the diaphragm opening as a function of the current through said photosensitive means. The motion picture camera in which the present invention resides further comprises motor means and first switch means for energizing and deenergizing the motor means. The present invention comprises a timing element. It comprises charging circuit means having a charging time constant for interconnecting said timing element and said diaphragm control means in such a manner that the current through said diaphragm control means varies at least in part at a rate corresponding to said charging time constant. The present invention further comprises discharge circuit means having a first time constant when said motor means is energized and a second time constant less than said first time constant when said motor means is deenergized. Finally, connecting means, responsive to external activation, are provided for connecting said timing element and said diaphragm control means in such a manner that the discharge of said timing element change the current through said diaphragm control means in a direction for closing the aperture of said diaphragm, whereby said diaphragm is closed at a rate corresponding to said first time constant when said motor means is energized and at a rate corresponding to said second time constant when said motor means is deenergized. It is seen that a rapid fade-out, corresponding to a short time constant, occurs when the motor means are deenergized, that is when the next operation will be a fade-in following the starting of the motor.

In a preferred embodiment of the present invention, the discharge circuit means comprise a first transistor having an emitter-collector circuit connected in parallel with said photosensitive means and a resistor connected in series with said emitter-collector circuit. Said timing element is a timing capacitor connected from the base to the collector-emitter circuit of said transistor. Said first transistor is normally in a blocked state, since the voltage at its base is the voltage at a voltage divider tap suitably adjusted for blocking said transistor. The discharge circuit means comprise additional resistor means and second transistor means having an emitter-collector circuit connected in parallel with said additional resistor means. The connecting means comprise switch means which, when closed, connect said additional resistor means in parallel with a portion of said voltage divider, thereby switching said first transistor to the conductive state. The second transistor has a base connected to the motor means in such a manner that the second transistor is blocked when said motor means is energized and is fully conductive when said motor means is deenergized. The fade-out thus takes place at a rate corresponding to a relatively large first time constant when the film advance motor is energized, and at a very rapid rate corresponding to the second time constant when the film advance motor is deenergized.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWING:

The single FIGURE shows a circuit diagram of the fade-in-fade-out arrangement of the present invention.

DESCRIPTION OF THE PREFERRED EMBODIMENT:

A preferred embodiment of the present invention will now be described with reference to the drawing.

The single FIGURE shows a source of electrical energy, namely a battery designated by reference numeral 1. The emitter of a transistor 3 is directly connected to the negative pole of the battery, while the collector of transistor 3 is connected to the positive side of the battery through the coil of a relay 4. The contacts 5 of relay 4 are connected in series with the film advance motor 6, herein referred to as motor means. Specifically, the first terminal of motor means 6 is directly connected to the positive side of battery 1, while the second terminal can be connected to and disconnected from the negative side of battery 1 by contacts 5. The base of transistor 3 is connected to the collector of a transistor 7 whose emitter is connected to the positive side of battery 1 through a resistor 8.

The base of transistor 7 is connected to the positive side of the battery through a resistor 9. Further, the base of transistor 7 is connected through a release contact 10 to one terminal of a resistor 11 whose other terminal is connected to the negative side of battery 1. Thus, when release contact 10 is closed resistors 9 and 11 form a voltage divider. Further, a capacitor 12 is connected from the common point of release contact 10 and resistor 11 to the positive side of battery 1. A reference voltage source furnishing a substantially constant output voltage regardless of current drain, such as a cadmium-nickel cell 13 (or alternatively a Zener diode); is connected in parallel with battery 1 through a protective resistor 14.

An exposure control circuit is connected in parallel with cell 13. The exposure control circuit comprises a photosensitive element 14 connected in series with a variable resistor 15, which in turn is connected to a moving coil instrument 16. Photoresistor 14 is arranged behind diaphragm 17 in the direction of incoming light. The opening of diaphragm 17, that is the aperture, is controlled by the moving coil instrument 16, herein referred to as diaphragm control means.

Connected in parallel with photoresistor 14 and variable resistor 15 is a series circuit comprising a diode 18, the emitter-collector circuit of a transistor 19, herein referred to as a first transistor, and a variable resistor 20, herein referred to as a second resistor means. A timing element, namely a timing capacitor 21 is connected between the collector and base of transistor 19. The base of transistor 19 is further directly connected to the voltage divider tap of a voltage divider comprising a resistor 22, herein referred to as first resistor means and a resistor 23. A resistor 25, herein referred to as additional resistor means may be connected in parallel with resistor 23 by the closing of the fade-in/fade-out switch 24, herein referred to as second switch means. Further, the emitter-collector circuit of a transistor 26, herein referred to as the second transistor, is connected in parallel with resistor 25. The base of transistor 26 is connected through a resistor 27 to the second terminal of motor means 6.

The above-described arrangement operates as follows:

First it will be assumed that all switches are in the position shown in the FIGURE. Thus motor means 6 are deenergized. The voltage at the base of transistor 19 is such that transistor 19 is blocked. The current flowing through the diaphragm control means 16 depends upon the photocurrent flowing through photoresistor 14. Thus, for a particular illumination, the aperture size is determined by the deflection of moving coil instrument 16. Capacitor 21 is charged to a voltage which is determined by the voltage drop across photoresistor 14 in addition to the voltage drop across resistor 15.

Since contact 5 is open, the base of transistor 26 is at a positive potential. Thus the base-emitter circuit of transistor 26 is a low resistance circuit. If switch 24 is now closed by the photographer, transistor 26 becomes fully conductive, since the voltage at its base is positive. As a result, transistor 19 becomes fully conductive after an almost negligible delay time, allowing capacitor 21 to discharge over resistor 20, the low ohmic cell 13, switch 24, and the collector-emitter circuit of transistor 26. Transistor 19 thus remains in the conductive state. As a result, a greatly increased current flows through measuring instrument 16 from the moment that transistor 19 becomes conductive, thereby allowing the aperture to be closed in a very short time. The fade-out thus takes place very rapidly. The discharge of capacitor 21, under the circumstances, takes place at the rate determined by the first time constant.

If release contacts 10 are now closed, the discharge of capacitor 12 causes an immediate switch to the conducting state of transistor 7 and thus of transistor 3. Current flows through the coil of relay 4, causing contacts 5 to close, thereby energizing motor 6. Under these conditions, the base of transistor 27 is connected to the negative side of battery 1, causing transistor 26 to block. However, the aperture remains closed, since the value of resistor 25 is such that transistor 19 remains conductive as long as switch 24 is closed.

Only when the fade-in/fade-out switch 24 is again opened does transistor 19 become non-conductive at a slow rate, causing the aperture to open slowly. Thus opening of switch 24 causes the fade-in process to be initiated.

If, after some time, fade-in/fade-out switch 24 is again closed, while the release contact 10 is still closed, a fade-out at the first time constant, that is a slow fade-out occurs. The reason for this is the increase in the time constant resulting from the addition of resistor 25 which is now no longer short-circuited by the emitter-collector circuit of transistor 26. Under these conditions, resistor 23 is of course in parallel with resistor 25 and capacitor 21 discharges through resistors 23 and 25. Furthermore capacitor 21 discharges through resistors 20 and 22.

While the invention has been illustrated and described as embodied in a circuit for changing the fade-out rate in dependence on the energization or deenergization of the motor, it is not intended to be limited to the details shown, since various modifications and circuit changes may be made without departing in any way from the spirit of the present invention.

Without further analysis, the foregoing will so fully reveal the gist of the present invention that others can by applying current knowledge readily adapt it for various applications without omitting features that, from the standpoint of prior art fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended claims:

1. In a motion picture camera having a diaphragm, a photosensitive means furnishing a photocurrent corresponding to the light falling thereon, diaphragm control means connected to said photosensitive means for varying the opening of said diaphragm in correspondence to said photocurrent, motor means, and first switch means for energizing and deenergizing said motor means, a fade-in/fade-out arrangement, comprising, in combination, timing circuit means having a first time constant when said motor means is energized and a second time constant less than said first time constant when said motor means is deenergized, for furnishing a first and second timing circuit current changing from a first to a second amplitude in a time interval corresponding to said first and second time constant respectively; and connecting means responsive to external activation for connecting said timing circuit means to said diaphragm control means in such a manner that said timing circuit current changes the current through said diaphragm control means in a direction for closing the aperture of said diaphragm, whereby said diaphragm is closed at a rate corresponding to said first time constant when said motor means is energized and at a rate corresponding to said second time constant when said motor means is deenergized.

2. An arrangement as set forth in claim 1, wherein said timing circuit means comprise a timing capacitor.

3. An arrangement as set forth in claim 2, wherein said timing circuit means further comprise charging circuit means connected to said timing capacitor for charging said timing capacitor; and discharge circuit means for discharging said timing capacitor; and wherein said discharge circuit means have said first and second time constant.

4. An arrangement as set forth in claim 3, further comprising a source of electrical energy; wherein said photosensitive means and said diaphragm control means are connected in series across said source of electrical energy; and wherein said charging circuit means comprise a first resistor connected in series with said timing capacitor, and means connecting said so-connected first resistor and timing capacitor in parallel with said photosensitive means.

5. An arrangement as set forth in claim 4, further comprising diode means connected between said diaphragm control means and said timing capacitor.

6. An arrangement as set forth in claim 4, wherein said discharge circuit means comprise first transistor means having an emitter-collector circuit connected in parallel with said photosensitive means, and a base; second resistor means connected in series with said emitter-collector circuit of said first transistor; means connecting said timing capacitor between said base and said emitter-collector circuit; voltage divider means having a voltage divider tap connected to said base of said first transistor, for furnishing a blocking voltage to said first transistor; additional resistor means; wherein said connecting means comprise second switch means responsive to external activation for connecting said additional resistor means in parallel with a predetermined portion of said voltage divider means, thereby switching said first transistor to the conductive state and initiating said discharge of said timing capacitor at a rate corresponding to said first time constant; further comprising means for short-circuiting said additional resistor means when said motor means is in said deenergized state, thereby discharging said timing capacitor at a rate corresponding to said second time constant.

7. An arrangement as set forth in claim 6, wherein said means for short-circuiting said additional resistor means comprise second transistor means having an emitter-collector circuit connected in parallel with said additional resistor means, and a base connected to said motor means in such a manner that said second transistor means is fully conductive when said motor means is deenergized and blocked when said motor means is energized.

8. An arrangement as set forth in claim 7, wherein said motor means has a first terminal directly connected to said source of electrical energy, and a second terminal; wherein said first switch means comprise relay controlled contact means connecting and disconnecting said second terminal of said motor means from said source of electrical energy; and wherein said base of said second transistor means is connected to said second terminal of said motor means.

* * * * *